(12) United States Patent
Ikeda et al.

(10) Patent No.: US 9,978,427 B2
(45) Date of Patent: May 22, 2018

(54) DATA RECORDER

(71) Applicant: TEAC Corporation, Tokyo (JP)

(72) Inventors: Tomohiro Ikeda, Tokyo (JP); Eiji Ueda, Tokyo (JP)

(73) Assignee: TEAC Corporation, Tokyo (JP)

( * ) Notice: Subject to any disclaimer, the term of this patent is extended or adjusted under 35 U.S.C. 154(b) by 0 days. days.

(21) Appl. No.: 14/596,175

(22) Filed: Jan. 13, 2015

(65) Prior Publication Data

US 2015/0205537 A1 Jul. 23, 2015

(30) Foreign Application Priority Data

Jan. 23, 2014 (JP) ................................. 2014-010305

(51) Int. Cl.
*G06F 3/06* (2006.01)
*G11B 27/031* (2006.01)
*G11B 27/32* (2006.01)

(52) U.S. Cl.
CPC .......... *G11B 27/327* (2013.01); *G06F 3/0617* (2013.01); *G06F 3/0643* (2013.01); *G06F 3/0653* (2013.01); *G06F 3/0673* (2013.01); *G11B 27/031* (2013.01)

(58) Field of Classification Search
CPC .... G06F 3/0617; G06F 3/0643; G06F 3/0653; G06F 3/0673; G11B 27/031; G11B 27/327
See application file for complete search history.

(56) References Cited

U.S. PATENT DOCUMENTS

| 6,094,693 | A | 7/2000 | Haneda | |
|---|---|---|---|---|
| 2002/0114610 | A1* | 8/2002 | Nakano | G11B 27/034 386/240 |
| 2006/0143478 | A1* | 6/2006 | Morino | G11B 20/00086 713/193 |
| 2007/0112862 | A1 | 5/2007 | Iwatsu et al. | |
| 2011/0142424 | A1 | 6/2011 | Hosokawa | |
| 2012/0296882 | A1* | 11/2012 | Lee | G06F 17/30147 707/693 |
| 2013/0179406 | A1 | 7/2013 | Shimada | |

(Continued)

FOREIGN PATENT DOCUMENTS

| CN | 1980357 A | 6/2007 |
|---|---|---|
| CN | 103198058 A | 7/2013 |
| JP | 06223483 A | 8/1994 |

(Continued)

*Primary Examiner* — Aracelis Ruiz
(74) *Attorney, Agent, or Firm* — Seed Intellectual Property Law Group LLP

(57) ABSTRACT

A device capable of continuing to record data even when a volume of data in a storage medium reaches a capacity limit in the middle of recording the data in the storage medium. A CPU of a data recorder divides data, which are to be recorded in one recording session, into a plurality of small files, and sequentially records the small files into memory. When a volume of data in the memory reaches a capacity limit of the memory, the earliest small file among the small files that are recorded in the memory and that make up the recording session is deleted, and the small files are continually recorded in an available space created by deletion. After completion of recording, all the small files making up the recording session are coupled and recorded in the memory.

7 Claims, 3 Drawing Sheets

(56) References Cited

U.S. PATENT DOCUMENTS

| | | | |
|---|---|---|---|
| 2014/0019496 A1* | 1/2014 | Chiu | H04L 67/06 |
| | | | 707/827 |
| 2015/0208053 A1* | 7/2015 | Hubin | H04N 5/765 |
| | | | 386/248 |

FOREIGN PATENT DOCUMENTS

| | | | |
|---|---|---|---|
| JP | 10-69420 A | | 3/1998 |
| JP | 2001228895 A | | 8/2001 |
| JP | 2007-20343 A | | 1/2007 |
| JP | 2007-109123 A | | 4/2007 |
| JP | 2008-263491 A | | 10/2008 |
| JP | 2009021751 A | * | 1/2009 |
| JP | 2009170037 A | | 7/2009 |
| JP | 4430279 B2 | | 3/2010 |
| JP | 2010128605 A | | 6/2010 |
| JP | 2011/130106 A | | 6/2011 |

* cited by examiner

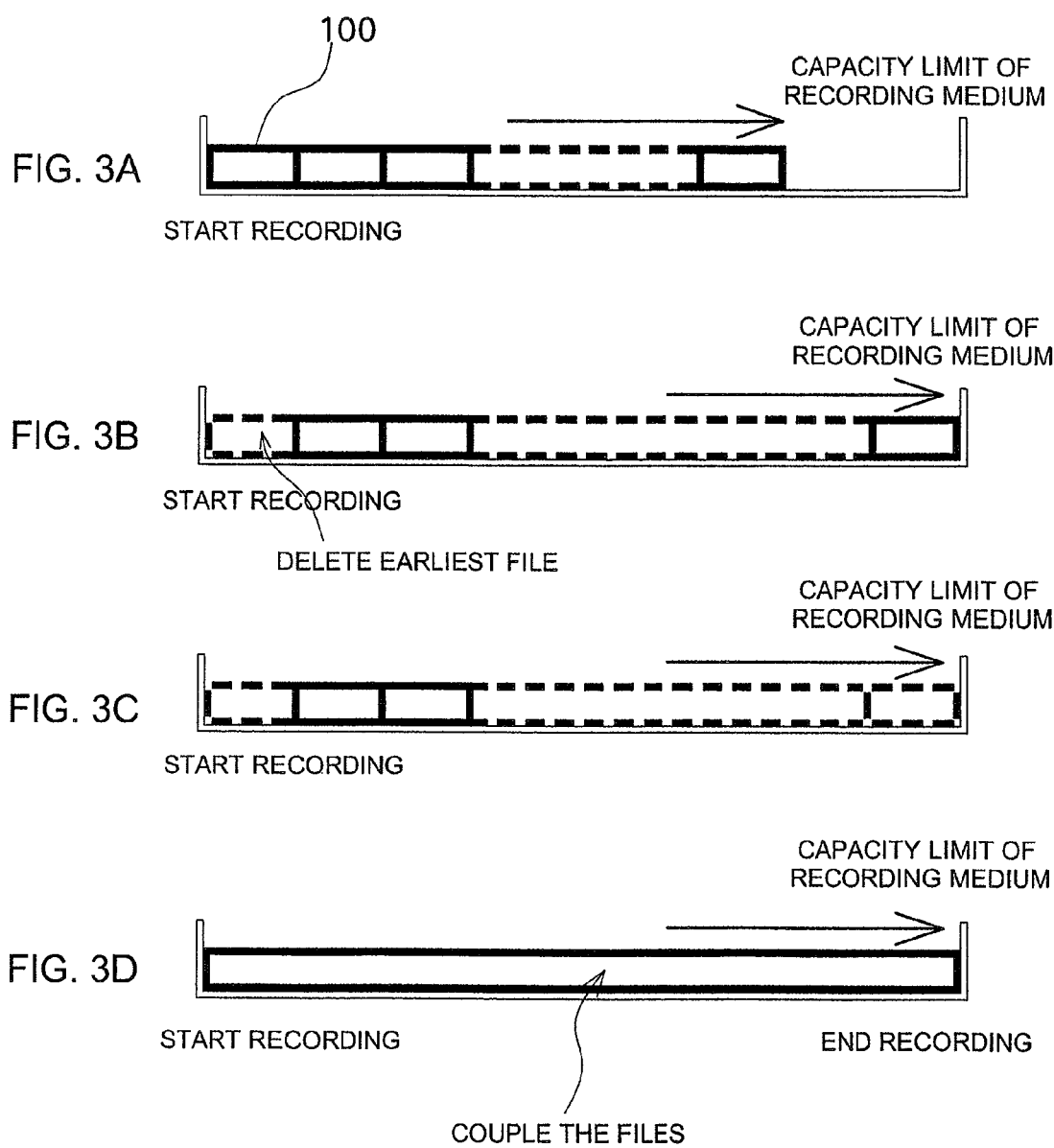

DATA RECORDER

PRIORITY INFORMATION

This application claims priority to Japanese Patent Application No. 2014-010305, filed on Jan. 23, 2014, which is incorporated herein by reference in its entirety.

BACKGROUND OF THE INVENTION

Technical Field

The present invention relates to a data recorder and, more particularly, to processing which is performed when a volume of data in a storage medium reaches a capacity limit of the storage medium.

Related Art

Processing has hitherto been proposed for a case where the volume of data in a storage medium reaches the capacity limit of the storage medium in the middle of recording the data, resulting in no available memory space.

JP 6-223483 A describes recording in advance audio recording date information pertinent to recorded music at a predetermined location on a disk and writing desired music over the recorded music with an early audio recording date when an unrecorded area becomes deficient in the middle of recording the desired music, thereby continuing recording.

JP 2009-170037 A describes continuing to record audio data by switching a memory card to a hard disk drive when an unrecorded area in the memory card becomes deficient, collecting the audio data recorded in a divided manner in both the memory card and the hard disk drive after completion of recording, and combining files together.

However, according to the technology described in connection with JP 6-223483 A, early-recorded music is indiscriminately erased unless erasure of the music is prohibited. For this reason, recorded music which the user has forgotten to protect might be unwillingly erased.

Moreover, the technology described in JP 2009-170037 A encounters a problem of a recording result being divided into a plurality of storage media and another problem of the technology being based on a premise of presence of another storage medium, such as a hard disk, in addition to a memory card.

SUMMARY

The present invention provides a device capable of continuing to record data even when a volume of data in a storage medium reaches a capacity limit of the storage medium in the middle of recording the data, without depending on the premise of presence of a plurality of storage media.

A data recorder of the present invention includes diving means for dividing, into a plurality of small files, data to be recorded in one recording session; recording means for recording the small files sequentially into a storage medium and deleting the earliest small file among the small files that are stored in the storage medium and that make up the recording session when a volume of data in the storage medium reaches a capacity limit of the storage medium, thereby continuing to record the small files into an available space obtained by deletion; and coupling means for coupling all of the small files that are recorded in the storage medium and that make up the recording session and recording the coupled files into the recording medium.

In one embodiment of the present invention, the recording means records the small files into the storage medium by adding a common identifier, which identifies the recording session, to the small files as their file name; and the coupling means couples the small files by use of the common identifier included in the file name of the small files.

In another embodiment of the present invention, the recording means records the small files into the storage medium by adding an identifier, which identifies a recording date, to the small files as their file name and deletes the earliest small file by use of the identifier included in the file name and specifying the recording date.

In the present invention, musical sound data can be recorded by taking the recording session as an audio recording session and the data to be recorded as musical sound data. Further, in the present invention, image data can be recorded in the storage medium by taking the recording session as a video recording session and the data to be recorded as image data.

According to the present invention, even when the volume of data in the storage medium reaches the capacity limit of the storage medium during recording of the data, recording the data into the same storage medium can be continued without interruption. According to the present invention, it does not necessary to prepare in advance a plurality of storage media against a case where the capacity limit of the storage medium is reached.

The present invention will be more clearly comprehended by reference to the embodiments provided below. However, the embodiments provided below are illustrative, and the scope of the invention is not limited to the embodiments.

BRIEF DESCRIPTION OF THE DRAWINGS

A preferred embodiment of the present invention will be described in detail by reference to the following drawings, wherein:

FIG. 3A is a diagrammatic view achieved at the start of recording, showing processing of the embodiment;

FIG. 3B is a diagrammatic view achieved when a capacity limit of a storage medium is reached, showing processing of the embodiment;

FIG. 3C is a diagrammatic view achieved after deletion of early files, showing processing of the embodiment; and FIG. 3D is a diagrammatic view achieved after completion of recording, showing processing of the embodiment.

DETAILED DESCRIPTIONS

An embodiment of the present invention is hereinafter described by reference to the drawings while a recorder for recording musical sound data is taken as a data recorder.

Figure 1:
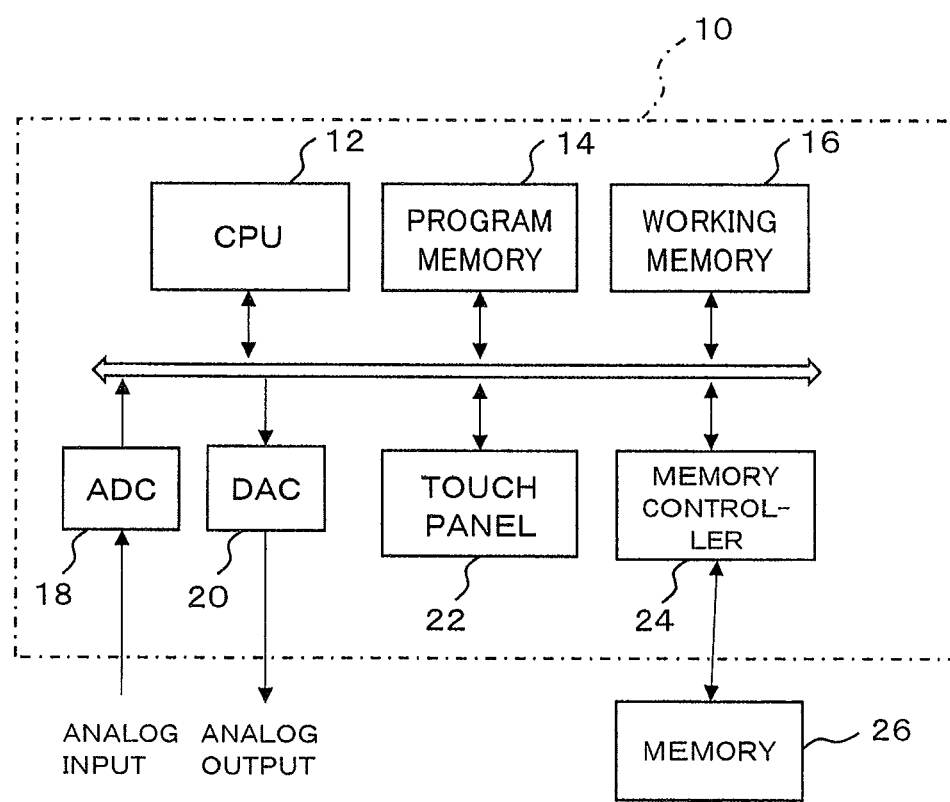
FIG. 1 is a block diagram of a configuration of an embodiment.

FIG. 1 shows a configuration block diagram of a recorder (portable digital recorder) 10 of the present embodiment. The recorder 10 is equipped with a CPU 12, program memory 14, working memory 16, an analog-to-digital converter (ADC) 18, a digital-to-analog converter (DAC) 20, a touch panel 22, and a memory controller 24.

The CPU 12 controls each of these parts according to a program stored in the program memory 14, converting analog musical sound data into digital data and recording the data in the memory 26. Specifically, the CPU 12 divides the musical sound data into virtual small files according to the program, recording the files in the memory 26. Moreover, the CPU 12 determines whether or not a volume of musical sound data reaches a capacity limit of the memory 26 in the course of recording the musical sound data in the memory 26. When the volume has not reached the capacity limit yet, the CPU 12 continues to record the musical sound data. Meanwhile, when the volume reaches the capacity limit, the CPU 12 continues to record the musical sound data after performing predetermined processing. Further, when recording of the musical sound data ends, the CPU 12 combines the virtually-divided small files together into one musical sound file, recording the file in the memory 26. The CPU 12 performs each of the processing operations by use of the working memory 16.

The ADC 18 converts the analog musical sound data input from a microphone or an input terminal into digital data, supplying the digital data to the CPU 12.

The DAC 20 converts the digital musical sound data stored in the memory 26 into the analog musical sound data, outputting the analog musical sound data to a speaker or an output terminal.

The touch panel 22 displays a state of the recorder 10, as well as enabling entry of user's various operations and supplying the thus-input operations to the CPU 12. The user's various operations include recording operation, playback operation, pausing operation, stop operation, etc. The state of the recorder 10 includes a recording time and a recording state. Incidentally, the recorder can also have, in place of the touch panel 22, an input device including various buttons and switches and a display device, such as a liquid crystal display and an organic electroluminescence display.

The memory controller 24 sequentially records the musical sound data, which are virtually divided into the small files, in the memory 26 in accordance with a command from the CPU 12. Moreover, in accordance with the command from CPU 12, the memory controller 24 reads the musical sound data recorded in the memory 26, supplying the thus-read musical sound data to the CPU 12.

The memory 26 is portable semiconductor memory, such as flash memory, and is connected to the memory controller 24 by being inserted into a slot of a main body of the recorder 10. In this connection, the memory 26 is portable semiconductor memory and removably attached to the main body of the recorder 10 in the present embodiment. The recorder 10; however, may incorporate the memory 26. In this case, the memory 26 also serves as a constituent member of the recorder equipment 10.

With such a configuration, when the user starts recording operation by manipulating the touch panel 22, the CPU 12 records the input musical sound data in the memory 26 while converting the data into digital data. However, if the volume of the data in the memory 26 reaches a capacity limit in the course of recording operation, recording cannot be continued as is. A configuration which automatically stops recording when the volume of data in the memory 26 reaches the capacity limit is cumbersome, because the user has to replace the memory 26 with another one and again record the musical sound data from the beginning. In the meantime, even another configuration in which a plurality of types of memory, or first memory and second memory, are prepared beforehand as the memory 26 and in which the musical sound data are recorded in a divided manner in the second memory when the volume of data in the first memory reaches a capacity limit deteriorates the user's ease of use, because single musical sound data are recorded in two memory devices in a divided manner. In addition, the latter configuration is based on the premise that the two memories are availably present.

The present embodiment is therefore based on the assumption that the volume of data in the memory 26 sometimes reaches the capacity limit during recording musical sound data. When musical sound data are recorded, the data are virtually divided, in advance, into small files and recorded. When the volume of data in the memory 26 reaches the capacity limit, an available space is created in the memory 26 by deleting the earliest file among the small files of musical sound data, and recording the musical sound data is continued by utilization of the thus-created available memory space.

Figure 2:
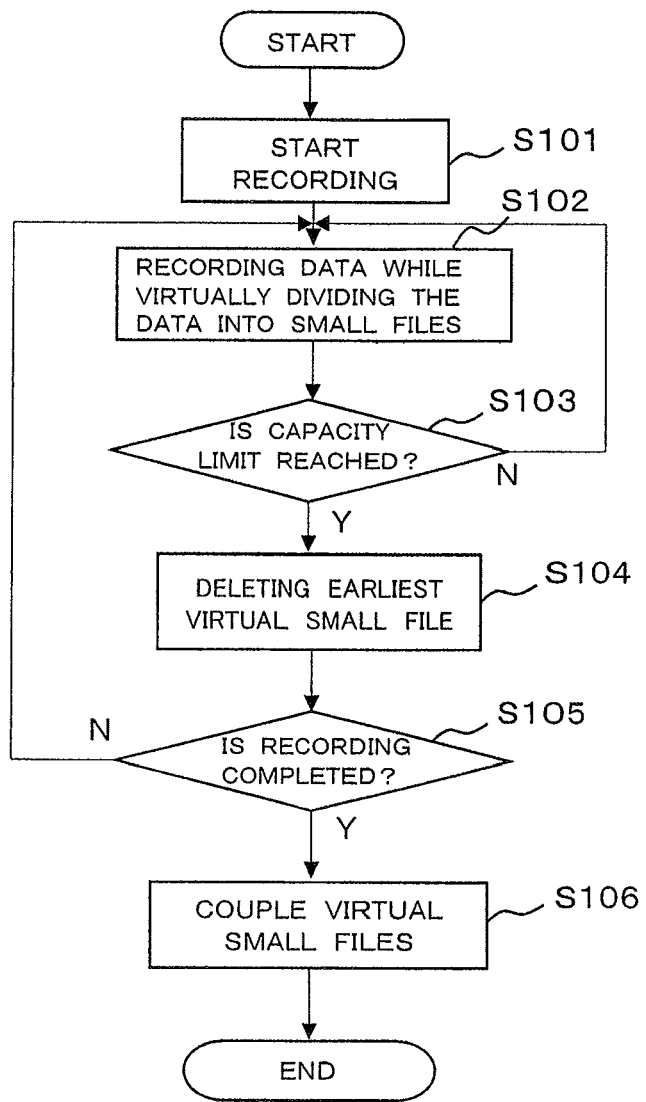
FIG. 2 is a processing flowchart of the embodiment.

FIG. 2 illustrates recording processing of the present embodiment.

When recording the musical sound data is started in accordance with user's recording operation (S101), the CPU 12 virtually divides the musical sound data into small files and stores them in the memory 26 (S102). Any specific restrictions are not imposed on the small files created by division, and the files can be determined according to a file system to be used. For example, musical sound data are divided every 16 MB. The word "virtually" used herein means formally dividing one piece of musical sound data into a plurality of small files. When musical sound data are virtually divided into small files, a file name showing continuity of data is previously added to each of the small files in order to show that the small files are musical sound data to be originally recorded in one recording session. For instance, when musical sound data are divided into three small files, file names are added to the files as follows:

File 1: Take_001_20131210120000.wav
File 2: Take_001_20131210150000.wav
File 3: Take_001_20131210180000.wav.

In the file names, "Take 001" is a recording session identifier (or index) showing that this file is one piece of musical sound data being recorded in this recording session, and "20131210120000" etc. following the identifier is a recording time identifier (or index). The recording session herein means one recording period from the start to the end of recording. The common recording session identifier "Take_001" is included in all of the file names, whereby it is easily understood that all of the small files make up single musical sound data. Moreover, the recording time is included in each of the file names, whereby a time sequence of the small files can be easily discriminated.

Incidentally, the recording session identifier and the recording time identifier can also be included in metadata on a file rather than in the file name. Alternatively, the recording session identifier can also be included in a file, and the recording time identifier can also be included in metadata. Although the recording session identifier is common to all of the small files that make up one recording session, any other mark can be used, so long as the mark makes it possible to identify small files belonging to a single recording session. Since, the plurality of small files are combined together and reconstructed as a single file as will be described later, the file name of each of the small files does not exist at the time of completion of recording. In this sense, the file name of each of the small files is virtual or temporary.

Next, when recording the musical sound data into the memory 26 while virtually dividing the data into small files, the CPU 12 determines whether the volume of data in the memory 26 reaches the capacity limit (S103). When the volume of the data in the memory 26 has not yet reached the capacity limit, recording the data in the memory 26 is repeated. On the other hand, when the volume of the data in the memory 26 reaches the capacity limit, the CPU 12 searches the earliest small file among the plurality of small files already recorded in the memory 26 in the current recording session, deleting the file before continuing recording operation (S104).

For example, files 1 to 3, which are three small files, are already recorded in the memory 26 as mentioned above. When the volume of the data in the memory 26 reaches the capacity limit in the course of recording a file 4 which is the next small file, the file 1 that is the earliest small file among the files 1 to 3 is eliminated. Since a recording time is included in the file name of each of the small files, the CPU 12 specifies the earliest small file by use of the file name.

Since an available memory space arises in the capacity of the memory 26 as a result of deletion of the earliest small file, the CPU 12 further continues to record the musical sound data by using the available memory space if recording is not completed (S105). When the volume of the data in the memory 26 again reaches the capacity limit as a result of recording being continued, another available memory space is again created by deletion of the earliest small file in the current recording session, and recording is continued by use of the thus-created available memory space. As above, the earliest small file in the current recording session is deleted each time the volume of data in the memory 26 reaches the capacity limit, whereby recording can be continued. Hence, so-called endless recording in which recording can be continued regardless of the capacity limit of the memory 26 is realized.

When all of the musical sound data are recorded by continuing recording the musical sound data as mentioned above or when the user himself/herself performs operation for stopping recording, recording ends (S105). The CPU 12 combines the virtual small files recorded in the memory 26 together into one file, recording the file in the memory 26 again (S106). Namely, the CPU 12 reads small files having the same recording session identifier in the file names while paying attention to the file names of the small files, combines the files in time sequence by use of the working memory 16, adds a single file name to the thus-combined file, and again records the file in the memory 26. For example, the single file name is File: Take_001wav.

In this regard, the working memory 16 does not always need to be used all the time when the small files are combined. If a memory space is determined to be unavailable as a result of the available memory space of the memory 26 being checked, the small files are combined by use of the working memory 16. Meanwhile, if the available memory space exists in the memory 26, the small files can also be combined by use of the available memory space of the memory 26. Moreover, combination of the small files can also be set so as to be automatically performed in response to completion of recording or in answer to a user command.

When a single file is created by combination of the file 1, the file 2, and the file 3 which are virtually-divided small files, a result is depicted as a single file=the file 1+the file 2+the file 3. When a single file is created by deleting the earliest file 1, recording a file 4 in the memory 26, and combining the files together, a result is depicted as a single file=the file 2+the file 3+the file 4. When a single file is created by deleting the earliest file 1 and the second earliest file 2, recording the file 4 and the file 5 in the memory 26, and combining the small files together, a result is depicted as a single file=the file 3+the file 4+the file 5.

FIGS. 3A to 3D diagrammatically show processing of the embodiment.

FIG. 3A shows a situation where recording of a certain recording session is started. Musical sound data are recorded in the memory 26 while being virtually divided into smaller files 100. Specifically, data which are originally a single file are recorded in the memory 26 while being virtually divided into a plurality of small files.

FIG. 3B shows a situation where a volume of data in the memory 26 reaches a capacity limit of the memory 26 at a certain point in time in the middle of recording being performed. When the volume of the data in the memory 26 reaches the capacity limit, the CPU 12 creates a corresponding available memory space by deleting the earliest small file in this recording session.

FIG. 3C shows a situation achieved after deletion of the earliest file. Since the available memory space is secured, recording is continually carried on by using the available memory space, whereby the data are recorded while being separated into the small files 100.

FIG. 3D shows a situation where recording is completed. All of the small files created in this recording session are combined together and recorded in the memory 26 as one file. Even if files irrelevant to the recording session are mixedly present in the memory 26, the CPU12 can combine the small files while excluding the unrelated files by using the file name of the small files. For example, even when a plurality of files, such as File 1: sound1.wav
File 2: sound2.wav
File 3: Take_001_20131210120000.wav
File 4: Take_001_20131210150000.wav
File 5: Take_001_20131210180000.wav
File 6: tempfile1.dat
File 7: tempfile2.dat, are mixedly recorded in the memory 26, only files 3, 4, and 5 constituting the recording session are specified and combined together into one musical sound data file. Moreover, even when the volume of the data in the memory 26 reaches the capacity limit, only the small files of this recording session are deleted, which obviates a risk of unintended deletion of irrelevant files.

As mentioned above, in the present embodiment, even when the volume of the data in the memory 26 reaches the capacity limit, recording does not need to be terminated, and the user can determine end timing of recording for himself/herself, and the latest musical sound data can be recorded in the memory 26 in time sequence without fail.

In the present embodiment, when the volume of the data in the memory 26 reaches the capacity limit in the middle of one recording session, the earliest small file is deleted, as a result of which a head of the current recording session disappears. However, it can be said to be of great significance that a recording session can be performed to the last without interruption.

The present embodiment; however, can also adopt another configuration which automatically terminates recording as in the case of the volume of the data in the memory 26 reaching the capacity limit or which allows the user to select whether to perform endless recording, such as that mentioned in the present embodiment. Moreover, the CPU 12 can automatically switch between normal recording and endless recording. For example, the available memory space of the memory 26 is checked at the commencement of one recording session. When the available memory space is 50% or more, normal recording is initiated (in other words, recording is started without dividing data into small files). In the meantime, when the available memory space of the memory 26 is less than 50% at the start of the recording session, endless recording of the present embodiment is initiated.

Furthermore, in the present embodiment, when the volume of the data in the memory 26 reaches the capacity limit, the earliest small file of the current recording session is deleted. However, deleting the earliest file and recording a small file to be recorded next can also be performed at one time by writing the small file to be recorded next over the earliest small file. Even overwrite recording does not make any difference, because it also entails deletion of the earliest file. Needless to say, the overwrite recording also falls within the scope of technical concept of the present invention.

Further, although the musical sound data are divided into small files in the present embodiment, a playback time can also be used as a reference for dividing musical sound data into small files. For example, musical sound data are divided into small files in every five minutes etc. A technology or a computer program for dividing a way file by a playback time is well-known and can use be used as-is. Moreover, the size of the small file is not fixed, and a variable size that the user can specify as necessary can also be adopted.

Although the present embodiment illustrates the recorder that records musical sound data, the present invention is not limited to the recorder. The present invention can also be applied to a device which records image data (including moving and still pictures). When image data are recorded, the essential requirement is to take an "audio-recording session" as a "recording session"; to divide data into small files in one recording session; and to delete the earliest small file among the small files, which make up the recording session, when the volume of data in the memory 26 reaches its capacity limit so as to assure an available memory space. The data recorder of the present invention can also be applied to any one of so-called recorders, computers, and mobile equipment.

What is claimed is:

1. A data recorder comprising:
a controller; and
a memory storing a program that, when processed by the controller, causes the controller to:
record data during one recording session;
divide, into a plurality of small files, the data recorded during the recording session;
store the small files sequentially into a storage medium and delete the earliest small file among the small files that are stored in the storage medium and that make up the recording session when a volume of data in the storage medium reaches a capacity limit of the storage medium, and continue to record at least one of the small files into an available space obtained by deletion of the earliest small file;
determine whether the recording session is completed; and
combine into one file all of the small files that are recorded in the storage medium and that make up the recording session, and store the one file into the storage medium, in response to determining that the recording session is completed.

2. The data recorder according to claim 1, wherein the program, when processed by the controller, causes the data recorder to:
record the small files into the storage medium by adding a common identifier, which identifies the recording session, to a file name of each of the small files; and
combine the small files using of the common identifier included in the file name of each of the small files.

3. The data recorder according to claim 1, wherein the program, when processed by the controller, causes the data recorder to record the small files into the storage medium by adding an identifier, which identifies a recording date, to a file name of each of the small files and delete the earliest small file using of the identifier, which identifies the recording date, included in the file name of each of the small files.

4. The data recorder according to claim 1, wherein the program, when processed by the controller, causes the data recorder to divide the data into the plurality of small files based on a file size or a playback time.

5. The data recorder according to claim 1, wherein the program, when processed by the controller, causes the data recorder to not divide the data into the plurality of small files when an available memory space of the storage medium assumes a predetermined ratio or more with respect to the capacity limit prior to a first recording session and to divide the data into the plurality of small files when the available memory space is less than the predetermined ratio.

6. The data recorder according to claim 1, wherein the recording session is an audio recording session, and the data to be recorded are musical sound data.

7. The data recorder according to claim 1, wherein the recording session is a video recording session, and the data to be recorded are image data.

* * * * *